United States Patent
Suresh et al.

(10) Patent No.: US 9,411,948 B1
(45) Date of Patent: Aug. 9, 2016

(54) SHUFFLED PASSCODE AUTHENTICATION FOR CRYPTOGRAPHIC DEVICES

(75) Inventors: Suji Suresh, Westford, MA (US); Samuel Adams, Andover, MA (US)

(73) Assignee: EMC Corporation, Hopkinton, MA (US)

( * ) Notice: Subject to any disclaimer, the term of this patent is extended or adjusted under 35 U.S.C. 154(b) by 749 days.

(21) Appl. No.: 13/527,064

(22) Filed: Jun. 19, 2012

(51) Int. Cl.
*G06F 21/34* (2013.01)

(52) U.S. Cl.
CPC ..................... *G06F 21/34* (2013.01)

(58) Field of Classification Search
USPC ........................................................ 713/155
See application file for complete search history.

(56) References Cited

U.S. PATENT DOCUMENTS

| | | | |
|---|---|---|---|
| 4,720,860 A | 1/1988 | Weiss | |
| 5,168,520 A | 12/1992 | Weiss | |
| 5,361,062 A | 11/1994 | Weiss et al. | |
| 5,428,349 A * | 6/1995 | Baker | 340/5.54 |
| 5,870,471 A | 2/1999 | Wootton et al. | |
| 7,409,705 B2 | 8/2008 | Ueda et al. | |
| 2007/0061589 A1* | 3/2007 | Ulmer et al. | 713/185 |
| 2007/0186105 A1 | 8/2007 | Bailey et al. | |
| 2008/0009345 A1 | 1/2008 | Bailey et al. | |
| 2010/0150348 A1* | 6/2010 | Fairbanks et al. | 380/255 |
| 2011/0119746 A1 | 5/2011 | Yang | |

FOREIGN PATENT DOCUMENTS

EP 2026494 A1 2/2009

OTHER PUBLICATIONS

J-C. Liou et al., "On Improving Feasibility and Security Measures of Online Authentication," International Journal of Advanced Computer Science and Technology (IJACST), 2010, p. 6-16, vol. 2, No. 4.
A.J. Menezes et al., "Handbook of Applied Cryptography," CRC Press, Oct. 1996, 794 pages.

* cited by examiner

*Primary Examiner* — Jacob Lipman
(74) *Attorney, Agent, or Firm* — Ryan, Mason & Lewis, LLP (57) ABSTRACT

A first cryptographic device is configured to generate a passcode for submission to a second authentication device. The second authentication device determines a particular type of shuffling to be applied to a passcode in conjunction with submission of that passcode for authentication, and verifies that the passcode has been entered in accordance with the particular type of shuffling. The first cryptographic device may comprise an authentication token and the second cryptographic device may comprise at least one authentication server. By way of example, the second cryptographic device may generate a shuffle indicator signal specifying the particular type of shuffling, such that the shuffle indicator signal can be transmitted and thereby made apparent to a user associated with the first cryptographic device. The user then alters his or her manner of entry of the passcode based on the received shuffle indicator signal, such as entering the passcode in a reverse order.

19 Claims, 4 Drawing Sheets

SHUFFLED PASSCODE AUTHENTICATION FOR CRYPTOGRAPHIC DEVICES

FIELD

The field relates generally to cryptography, and more particularly to authentication techniques implemented using cryptographic devices.

BACKGROUND

Cryptographic devices include, by way of example, one-time passcode (OTP) devices such as hardware authentication tokens. Authentication tokens are typically implemented as small, hand-held devices that display a series of passcodes over time. A user equipped with such an authentication token reads the currently displayed passcode and enters it into a computer or other element of an authentication system as part of an authentication operation. This type of dynamic passcode arrangement offers a significant security improvement over authentication based on a static password.

Conventional authentication tokens include both time-synchronous and event-synchronous tokens.

In a typical time-synchronous token, the displayed passcodes are based on a secret value and the time of day. A verifier with access to the secret value and a time of day clock can verify that a given presented passcode is valid.

One particular example of a time-synchronous authentication token is the RSA SecurID® user authentication token, commercially available from RSA, The Security Division of EMC Corporation, of Bedford, Mass., U.S.A.

Event-synchronous tokens generate passcodes in response to a designated event, such as a user pressing a button on the token. Each time the button is pressed, a new passcode is generated based on a secret value and an event counter. A verifier with access to the secret value and the current event count can verify that a given presented passcode is valid.

Other known types of authentication tokens include hybrid time-synchronous and event-synchronous tokens.

Passcodes can be communicated directly from the authentication token to a computer or other element of an authentication system, instead of being displayed to the user. For example, a wired connection such as a universal serial bus (USB) interface may be used for this purpose. Wireless authentication tokens are also known. In such tokens, the passcodes are wirelessly communicated to a computer or other element of an authentication system. These wired or wireless arrangements, also referred to herein as connected tokens, save the user the trouble of reading the passcode from the display and manually entering it into the computer.

Additional details of exemplary conventional authentication tokens can be found in, for example, U.S. Pat. No. 4,720,860, entitled "Method and Apparatus for Positively Identifying an Individual," U.S. Pat. No. 5,168,520, entitled "Method and Apparatus for Personal Identification," and U.S. Pat. No. 5,361,062, entitled "Personal Security System," all of which are incorporated by reference herein.

Many authentication systems are configured to require that a user enter a personal identification number (PIN) or other static access code in addition to entering the passcode from the authentication token. This provides an additional security factor, based on something the user knows, thereby protecting against unauthorized use of an authentication token that is lost or stolen. Such an arrangement is generally referred to as two-factor authentication, in that authentication is based on something the user has (e.g., the authentication token) as well as something the user knows (e.g., the PIN).

Authentication tokens and other OTP devices are typically programmed with a random seed or other type of key that is also stored in a token record file. The record file is loaded into an authentication server, such that the server can create matching passcodes for the authentication token based on the key and the current time or current event count. When the user first activates the token, the server stores the user PIN in association with the key corresponding to that token.

Although passcodes generated by authentication tokens and other types of cryptographic devices are commonly used to provide secure authentication in a wide variety of different applications, there exists a need for techniques for enhancing the security provided when using such passcodes.

SUMMARY

One or more illustrative embodiments of the present invention provide shuffled passcode authentication techniques for use with hardware and software authentication tokens as well as other types of cryptographic devices.

In one embodiment, a first cryptographic device is configured to generate a passcode for submission to a second authentication device. The second authentication device determines a particular type of shuffling to be applied to a passcode in conjunction with submission of that passcode for authentication, and verifies that the passcode has been entered in accordance with the particular type of shuffling.

The first cryptographic device may comprise an authentication token and the second cryptographic device may comprise at least one authentication server.

By way of example, the second cryptographic device may generate a shuffle indicator signal specifying the particular type of shuffling, such that the shuffle indicator signal can be transmitted and thereby made apparent to a user associated with the first cryptographic device. The user then alters his or her manner of entry of the passcode based on the received shuffle indicator signal, such as entering the passcode in a reverse order.

The illustrative embodiments provide improved security for passcode authentication, without requiring any significant or costly changes to authentication tokens, authentication servers or authentication protocols.

DETAILED DESCRIPTION

Illustrative embodiments of the present invention will be described herein with reference to exemplary communication systems and associated servers, clients and other processing devices. It is to be appreciated, however, that the invention is not restricted to use with the particular illustrative system and device configurations shown. Accordingly, the term "communication system" as used herein is intended to be broadly construed, so as to encompass, for example, systems in which multiple processing devices communicate with one another but not necessarily in a manner characterized by a client-server model.

The term "passcode" as used herein is intended to include authentication information such as OTPs, or more generally any other information that may be utilized for cryptographic authentication purposes. Such passcodes may therefore include numerical tokencodes, alphanumeric passwords, passphrases, etc. Although the illustrative embodiments will be described below primarily in the context of OTPs, it is to be appreciated that the invention is more broadly applicable to any other type of passcode.

The term "cryptographic device" as used herein is intended to be construed broadly, so as encompass not only authentication tokens but also other types of devices that can provide or process passcodes in the manner disclosed herein. Similarly, the term "authentication server" should be understood to encompass any type of processing device or set of such devices that is operative to authenticate a passcode provided by an authentication token or other type of cryptographic device. It need not be a network-based server, and may be implemented as a portion of a device that performs other functions, as a combination of multiple servers or other devices, or in other forms.

As will be described, the present invention in one or more illustrative embodiments provides shuffled passcode authentication techniques for use with authentication tokens and other types of cryptographic devices.

Figure 1:
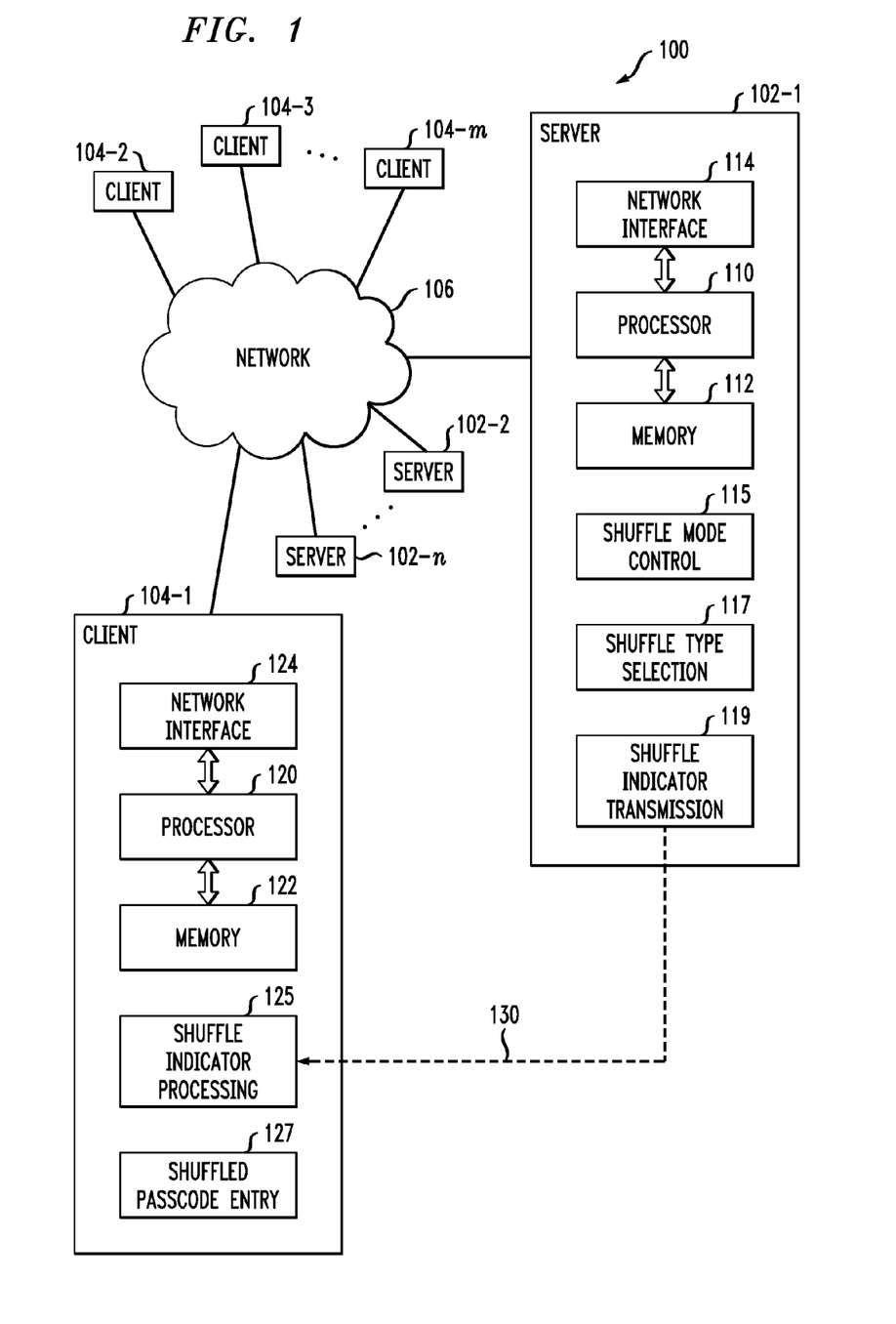
FIG. 1 is a block diagram of a communication system with shuffled passcode authentication functionality in an illustrative embodiment of the invention.

FIG. 1 shows a communication system 100 that incorporates shuffled passcode authentication functionality in an illustrative embodiment. The system 100 comprises a plurality of servers 102-1, 102-2, . . . 102-n that are configured to communicate with a plurality of clients 104-1, 104-2, . . . 104-m, over a network 106.

The servers 102 and clients 104 may be implemented as respective processing devices. A given such processing device may comprise, for example, a computer, a mobile telephone or other type of communication device. Each such processing device generally comprises at least one processor and an associated memory, and implements one or more functional modules for controlling certain features of the system 100.

The system 100 in the present embodiment implements one or more processes for shuffled passcode authentication. An example of such a process performed by a given one of the clients 104 in order to authenticate to one or more of the servers 102 will be described in conjunction with FIG. 3, but it is to be appreciated that numerous other types of processes may be used in other embodiments.

A given one of the servers 102-1 in the present embodiment comprises a processor 110 coupled to a memory 112. The processor 110 may comprise a microprocessor, a microcontroller, an application-specific integrated circuit (ASIC), a field-programmable gate array (FPGA) or other type of processing circuitry, as well as portions or combinations of such circuitry elements. The memory 112 may comprise random access memory (RAM), read-only memory (ROM) or other types of memory, in any combination.

The memory 112 and other memories disclosed herein may be viewed as examples of what are more generally referred to as "computer program products" storing executable computer program code.

Also included in the server 102-1 is network interface circuitry 114. The network interface circuitry 114 allows the server 102-1 to communicate over the network 106 with the other servers 102 and with the clients 104, and may comprise one or more conventional transceivers.

The server 102-1 further includes a shuffle mode control module 115, a shuffle type selection module 117, and a shuffle indicator transmission module 119. One or more of these modules may be implemented at least in part in the form of software that is stored in memory 112 and executed by processor 110.

At least a subset of the other servers 102 of the system 100 may be assumed to be configured in a manner similar to that shown for server 102-1 in the figure.

A given one of the clients 104-1 in the present embodiment comprises a processor 120 coupled to a memory 122. The processor 120, like processor 110 in server 102, may comprise a microprocessor, a microcontroller, an ASIC, an FPGA or other type of processing circuitry, as well as portions or combinations of such circuitry elements, and the memory 122 may comprise RAM, ROM or other types of memory, in any combination.

Also included in the client 104-1 is network interface circuitry 124. The network interface circuitry 124 allows the client 104-1 to communicate over the network 106 with the servers 102 and with the other clients 104, and may comprise one or more conventional transceivers. The network interface circuitry 124 may also be used to support communication with network interface circuitry 114 of one or more of the servers 102 utilizing out-of-band channels, as will be described in greater detail below.

The client 104-1 further includes a shuffle indicator processing module 125 and a shuffled passcode entry module 127. One or more of these modules may be implemented at least in part in the form of software that is stored in memory 122 and executed by processor 120.

At least a subset of the other clients 104 of the system 100 may be assumed to be configured in a manner similar to that shown for client 104-1 in the figure.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

In the present embodiment, a shuffle indicator signal is transmitted by server 102-1 to client 104-1 using an out-of-band channel 130 represented as a dashed line in the figure. The term "out-of-band" in this context is intended to be broadly construed so as to encompass a different network connection than that typically used for communication between server 102-1 and client 104-1 over network 106.

Although illustratively shown as being separate from network 106, channel 130 may pass through a different portion of network 106, or otherwise be configured in an out-of-band manner relative to one or more other communication links between the client and server. Examples of out-of-band channels that may be utilized in embodiments of the present invention include text messaging channels, email channels, telephony channels, etc.

The communication system 100 as shown in FIG. 1 is configured to allow a particular user associated with a first cryptographic device, such as a given one of the clients 104, to authenticate himself or herself to at least a second cryptographic device, such as one or more of the servers 102, using what is generally referred to herein as a "shuffled passcode." The communication system 100 and other similar systems herein are therefore also referred to as authentication systems. The shuffled passcode in the present embodiment refers to a passcode that would ordinarily be entered into the authentication system by the user in a certain manner, but that is instead entered in a different manner responsive to receipt of the shuffle indicator signal.

Thus, for example, in an implementation in which client 104-1 comprises or is otherwise associated with a hardware authentication token that generates a series of time-synchronous passcodes in the form of respective numerical passcodes each comprising a set of digits, instead of a user entering the digits of a given numerical passcode in the normal order, at least a portion of the digits of the given numerical passcode are entered by the user in a different order, such as in reverse order. The particular manner in which the passcode is to be shuffled upon entry may be specified by the shuffle indicator signal provided to client 104-1 by server 102-1.

The term "shuffle" as used herein is intended to be broadly construed, so as to encompass, for example, a wide variety of different types of reorderings or other variations in the manner of entry of particular portions of a given passcode, relative to ordinary entry absent the variation in the manner of entry. Also, the term "user" is intended to be broadly construed, and may encompass a human user, or at least a portion of an associated client device, or combinations thereof.

In one or more embodiments of shuffled passcode authentication as disclosed herein, a first cryptographic device is configured to generate a passcode for submission to a second authentication device. As noted above, the first cryptographic device may comprise an authentication token incorporated in or otherwise associated with client 104-1. The second authentication device, which as indicated previously may comprise one or more authentication servers, determines a particular type of shuffling to be applied to a passcode in conjunction with submission of that passcode for authentication, and verifies that the passcode has been entered in accordance with the particular type of shuffling. By way of example, the second cryptographic device may generate the above-noted shuffle indicator signal specifying the particular type of shuffling, such that the shuffle indicator signal can be transmitted and thereby made apparent to a user associated with the first cryptographic device. The user then alters his or her manner of entry of the passcode based on the received shuffle indicator signal, such as entering the passcode in a reverse order.

The server 102-1 in the present embodiment is configured to switch between a shuffled passcode authentication mode and an unshuffled passcode authentication mode, using the shuffle mode control module 115. Thus, for example, under some conditions the server 102-1 may elect to perform normal authentication, without any modification in the manner of entry of passcodes by an authenticating user. The server can then under other conditions alter its manner of operation by entering the shuffled passcode authentication mode, in which it requires one or more passcodes entered via the client 104-1 to be shuffled at entry in a particular manner. For example, the server 102-1 may switch from the unshuffled passcode authentication mode to the shuffled passcode authentication mode responsive to at least one of a determination that a user associated with the client 104-1 is required to enter a next passcode of a series of time-synchronous passcodes, a determination that an additional challenge is to be presented to the user, or a determination that a panic indicator signal has been received. These and other scenarios may each warrant a heightened level of security and therefore use of the shuffled passcode authentication mode.

In the shuffled passcode authentication mode, the server 102-1 utilizes shuffle type selection module 117 to select a particular type of shuffling from a plurality of different available types of shuffling supported by the server 102-1. This shuffle type selection may involve selection of a particular shuffling algorithm by the server, where the shuffling algorithm identifies a particular type of shuffling.

The various available types of shuffling may include, for example, different permutations of the digits of the passcode, such as the above-noted reverse ordering, as well as others including switching of the first k digits with the last k digits in an embodiment in which the passcode comprises at least 2k digits (e.g., type in the first three digits of a six-digit passcode last and vice-versa). The shuffle type selection module 117 can be configured to randomly select from among the plurality of different available types of shuffling, each corresponding to a different shuffling algorithm.

The server 102-1 in the present embodiment communicates an indication of the particular type of shuffling selected by shuffle type selection module 117 to the client 104-1. This indication is communicated in the form of a shuffle indicator signal generated and transmitted by the shuffle indicator transmission module 119. As mentioned above, out-of-band channel 130 is utilized to transmit the shuffle indicator signal to the client 104-1, although other channels, including in-band channels, may be used in other embodiments. As one more particular example, the shuffle indicator signal may be transmitted as part of a text message sent to the client 104-1, such as a text message transmitted in accordance with a short message service (SMS) protocol. Other examples of possible out-of-band channel messages include emails, automated voice calls, etc.

The client 104-1 receives the shuffle indicator signal transmitted over out-of-band channel 130 and processes that signal in shuffle indicator processing module 125. Thus, for example, the client 104-1 may process the shuffle indicator signal by displaying at least a portion of the shuffle indicator signal, or information extracted therefrom, to a user via a display or other perceptible output generator of the client 104-1, or may otherwise make the need for shuffled passcode entry apparent to the user. The user will respond by entering the shuffled passcode using shuffled passcode entry module 127.

The manner in which shuffle indicator signal information is presented to a user may be designed to provide additional security. For example, a message received over an out-of-band channel to indicate reverse entry of a passcode may simply indicate the word "reverse" or the letter R, with the context and appropriate response being fully understood to a legitimate user but remaining cryptic to a potential attacker.

The server 102-1 and client 104-1 may previously agree upon certain types of shuffling to be used under certain conditions, such that the shuffle indicator signal need not even convey the particular selected shuffling type. For example, for certain times of the day or days of the week use of certain types of shuffling may be predetermined as per previous agreement or other understanding between server and client. Also, the shuffle indicator signal can be eliminated altogether in embodiments in which the server and client both know that shuffling of a certain type will always be used under certain specified conditions, such as responsive to a certain number of unsuccessful authentications.

It is to be appreciated that the particular set of elements shown in FIG. 1 for providing shuffled passcode authentication is presented by way of example, and in other embodiments additional or alternative elements may be used. Thus, another embodiment may include additional networks and additional sets of clients or servers.

As mentioned previously, various elements of system 100 such as clients, servers or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, servers, storage devices or other types of processing devices.

Such processing platforms may include cloud infrastructure comprising virtual machines (VMs) and one or more associated hypervisors. An example of a commercially available hypervisor platform that may be used to implement portions of the communication system 100 is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the system 100.

As noted above, in one or more of the illustrative embodiments, the first cryptographic device and the second cryptographic device may comprise an authentication token and an authentication server, respectively.

Figure 2:
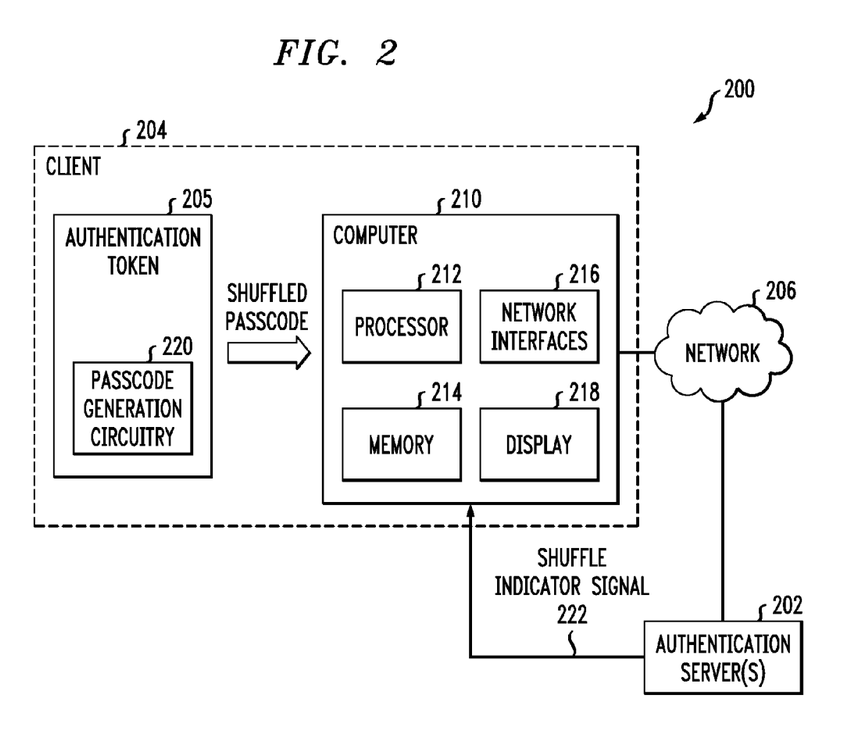
FIG. 2 shows one possible implementation of the FIG. 1 system including an authentication token and one or more authentication servers in an illustrative embodiment of the invention.

FIG. 2 shows an example of an authentication system 200 corresponding generally to an implementation of communication system 100 in which one or more authentication servers 202 authenticate a client 204 that comprises or is otherwise associated with an authentication token 205. A passcode generated by the authentication token 205 is provided in shuffled form to a given authentication server 202 via network 206 and a host device 210 that illustratively comprises a computer.

As indicated previously, the term "cryptographic device" as used herein is intended to be broadly construed so as to encompass, for example, authentication token 205 alone or in combination with at least a portion of the host device 210. In other embodiments, such as those involving use of software tokens, the first cryptographic device may comprise only host device 210, which as indicated above may be implemented as a computer or another type of processing device, such as a mobile telephone.

The authentication token 205 is configured to generate OTPs or other passcodes in a conventional manner. Such passcodes may be presented to a user via a display of the token, such that the user can manually enter corresponding shuffled passcodes into a user interface of the host device 210. Alternatively, a given passcode may be communicated directly from the authentication token 205 via a wired or wireless connection between the token and the host device 210. By way of example, the authentication token may be configured to communicate with the host device 210 via a wired connection such as a USB interface, or via a wireless connection such as a Bluetooth or IEEE 802.11 connection. The user can then control the host device 210 via a user interface such that the given passcode is entered in shuffled form for authentication.

As another alternative, the shuffling to be applied to a passcode may be automatically determined by a trusted module of the host device 210 from a received shuffle indicator signal or otherwise, and applied directly to a normally entered passcode without requiring intervention from the user. Thus, certain embodiments of the invention can operate in a manner in which the passcode shuffling is made entirely transparent to the user.

The authentication token 205 may be, for example, a time-synchronous authentication token, an event-synchronous authentication token, a challenge-response token, a hash-chain token, or a hybrid token that incorporates multiple such capabilities, such as a hybrid time-synchronous and event-synchronous token. A given authentication token may be a connected token or a disconnected token, or one capable of operating in both connected and disconnected modes. The disclosed techniques can be adapted in a straightforward manner for use with other types of authentication devices, or more generally cryptographic devices.

As a more particular example, the authentication token 205 may comprise a time-synchronous authentication token such as the above-noted RSA SecurID® user authentication token. A token of this type typically generates passcodes in the form of sets of digits, such as sets of six digits. Each of the passcodes in a given series of passcodes is valid only for a particular period of time, such as a minute. Accordingly, the passcode output of the authentication token in this case is updated approximately once every minute. These update time periods are also referred to as "epochs."

The host device 210 may comprise a desktop or portable personal computer, mobile telephone, personal digital assistant (PDA), wireless email device, workstation, kiosk, television set-top box, game console, or any other processing device that provides an interface between authentication token 205 and a given authentication server 202.

As shown in the figure, the host device 210 generally comprises a processor 212, a memory 214, and one or more network interfaces 216 which allow the device to communicate with a given authentication server 202 over the network 206.

It should also be noted that a given authentication token need not take the form of a stand-alone hardware token. For example, such a device may be incorporated into another processing device, such as a computer, mobile telephone, etc. In one such implementation, the host device and the authentication token may be combined into a single processing device that communicates with the authentication server.

The host device 210 in the system 200 further comprises a display 218, and the authentication token 205 comprises passcode generation circuitry 220. The passcode generation circuitry outputs a series of passcodes over time that a user enters into the host device 210 for respective instances of an authentication protocol. However, as previously described, when using shuffled passcode authentication the user does not enter the generated passcode in the normal manner. Instead, the authentication server 202 provides a shuffle indicator signal via an out-of-band channel 222, and the computer presents to the user via display 218 an indication of the particular type of shuffling to be applied to the passcode upon entry. The user responds to the indication of the particular type of shuffling by entering the passcode in accordance with that particular type of shuffling.

Thus, for example, in the case of the six-digit passcodes described above, the user may type in the six digits of the passcode in reverse order, assuming that reverse order shuffling is indicated by the authentication server 202. The type of shuffling to be applied to the generated passcodes when entered by the user may be updated for each epoch of a time-synchronous token, or a given shuffling type may be applied over multiple epochs, as determined by the authentication server 202.

In the system 200, the authentication server 202 is configured as a back-end authentication server, in that it communicates with host device 210 over a network, but other types of authentication servers may be used.

A wide variety of authentication processes may be implemented using an authentication token 205, authentication server 202 and host device 210 arranged as shown in FIG. 2.

Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

It is to be appreciated that a given embodiment of the system 200 may include multiple instances of authentication token 205, authentication server 202 and host device 210, and possibly other system components, although only single instances of such components are shown in the simplified system diagram of FIG. 2 for clarity of illustration. Also, as indicated previously, other embodiments may combine certain system elements, such as the authentication token and the host device. It is also possible to eliminate, modify or replace other system elements. For example, authentication token 205 may communicate directly with authentication server 202, rather than via other elements such as host device 210 and network 206.

The operation of one possible implementation of systems 100 and 200 will now be described in greater detail with reference to the flow diagram of FIG. 3, which shows a set of operations performed by various elements associated with client and server devices of an authentication system in an illustrative embodiment. More particular, in this embodiment a user 300 is attempting to access a protected resource 302, which may comprise a resource within or accessible by host device 210. The protected resource communicates via an agent 304 with a server 306 that implements at least one shuffling algorithm 308 corresponding to a particular type of shuffling to be applied.

Although shown as a separate element, the shuffling algorithm 308 may be implemented within the server 306. Also, the agent 304 may be part of the same host device 210 through which the user 300 attempts to access protected resource 302. Accordingly, as noted above, the various elements 302 through 306 may correspond to elements of the authentication systems 100 or 200.

The shuffled passcode authentication process implemented in the FIG. 3 embodiment proceeds as follows:

Step 1: User 300 attempts to access protected resource 302 by entering user identifier "username" and initiating authentication process via agent 304.

Step 2: Server 306 randomly chooses particular shuffling algorithm 308 and sends an indication of the selected shuffling algorithm to the user via an out-of-band channel (e.g., SMS text message). In this embodiment, a reverse order shuffling is selected, indicating that the user must enter the passcode in reverse order. The passcodes in this embodiment are more particularly referred to as tokencodes, and are assumed to be generated by an authentication token and to comprise a set of digits.

Step 3: User enters the shuffled tokencode.

Step 4: Server unscrambles the shuffled tokencode and authenticates the user. The server returns an indication of successful authentication to the user, and the user gains access to the protected resource.

Figure 3:
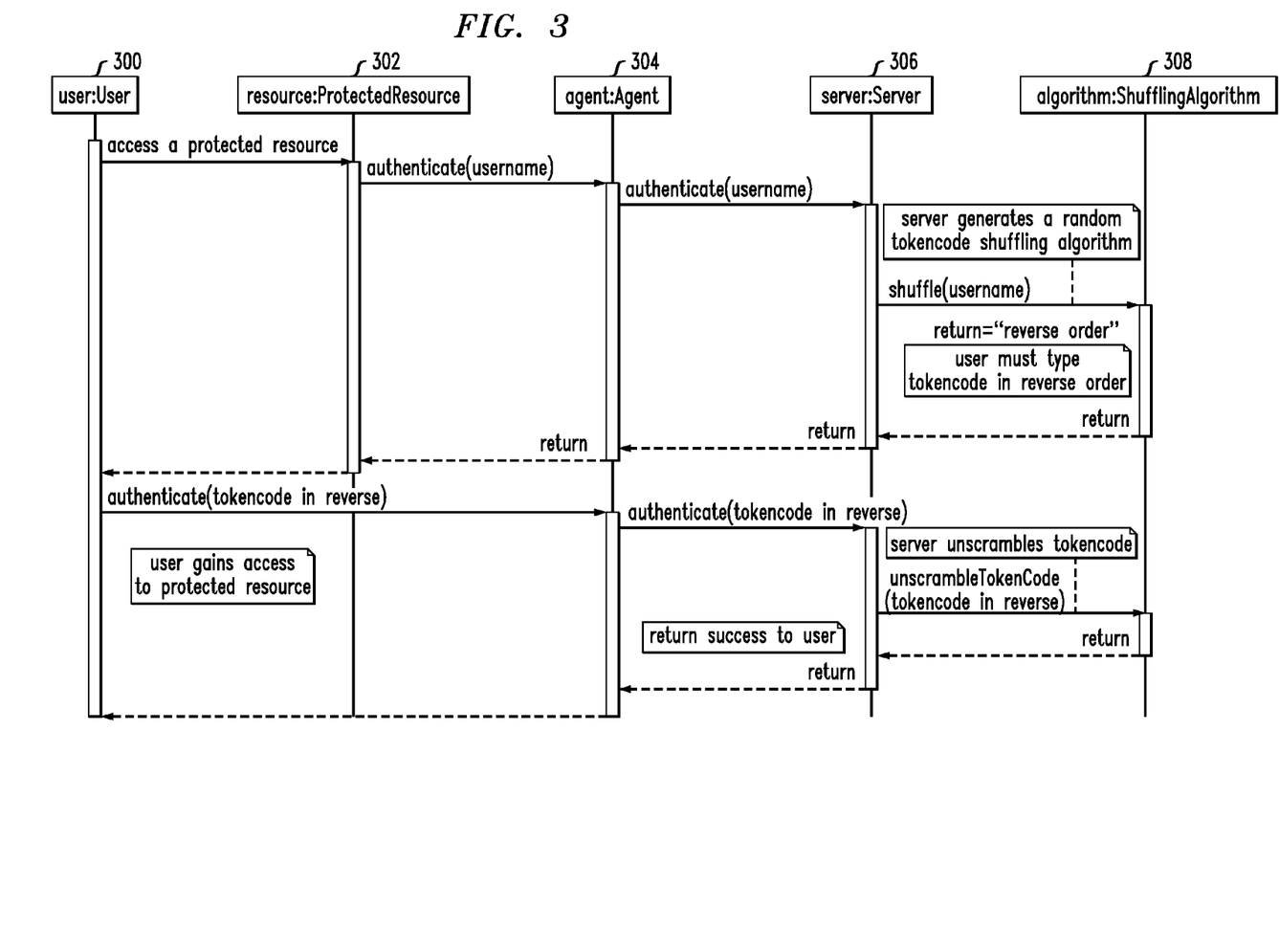
FIG. 3 is a flow diagram of a shuffled passcode authentication process implemented in the system of FIG. 1 or FIG. 2.

In the FIG. 3 embodiment, the authentication process does not require the use of a PIN. As a result, the user does not have to remember any information, but instead simply enters the passcode generated by his or her authentication code, albeit in reverse order as determined by the server.

The particular processing operations and other system functionality described in conjunction with the flow diagram of FIG. 3 are presented by way of illustrative example only, and should not be construed as limiting the scope of the invention in any way. Alternative embodiments can use other types of processing operations for shuffled passcode authentication. For example, the ordering of the process steps may be varied in other embodiments, or certain steps may be performed concurrently with one another rather than serially. Also, the process steps may be repeated periodically.

As another example, one possible variant of the FIG. 3 process may be one that takes into account the fact that the user is required to enter a next passcode of a series of time-synchronous passcodes, due to a transition from one epoch to the next epoch. Such a variant may proceed as follows:

Step 1: User enters username.

Step 2: User enters tokencode.

Step 3: Server determines that the user is required to enter the next tokencode.

Step 4: Server randomly chooses particular shuffling algorithm and sends an indication of the selected shuffling algorithm to the user via an out-of-band channel.

Step 5: User enters the next tokencode in accordance with the specified shuffling.

Step 6: Server unscrambles the shuffled tokencode and authenticates the user.

In the above variant, the shuffled passcode authentication is performed upon a user attempting to authenticate using a tokencode that is not the latest tokencode in the series of tokencodes.

Another variant of the FIG. 3 process is one in which shuffled passcode authentication is used as an additional challenge in order to confirm identity of the user in conjunction with an attempted normal passcode authentication. Such a variant may proceed as follows:

Step 1: User enters username.

Step 2: User enters tokencode.

Step 3: Server determines that the user or its associated client device is risky and is to be subject to an additional challenge.

Step 4: Server randomly chooses particular shuffling algorithm and sends an indication of the selected shuffling algorithm to the user via an out-of-band channel.

Step 5: User enters the next tokencode in accordance with the specified shuffling.

Step 6: Server unscrambles the shuffled tokencode and authenticates the user.

The additional challenge presented to the user in this variant provides enhanced security relative to other conventional additional challenge techniques such as asking the user one or more life questions.

As yet another variant, the shuffled passcode authentication may be implemented responsive to a determination that a panic indicator signal has been received. Such a panic indicator may be received, for example, when a set of authentication devices or associated record files have been stolen or otherwise compromised. In this situation, the shuffle mode control module 115 or a similar element can configure the server to perform shuffled passcode authentication instead of unshuffled or normal passcode authentication, until the panic condition is resolved.

It is to be appreciated that shuffled passcode authentication functionality such as that described in conjunction with the flow diagram of FIG. 3 can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

The embodiments described in conjunction with FIGS. 1-3 can provide a number of significant advantages relative to conventional practice. For example, these embodiments provide authentication techniques that exhibit enhanced security relative to conventional passcode authentication, and can be readily deployed at low cost using existing authentication tokens and other infrastructure.

Figure 4:
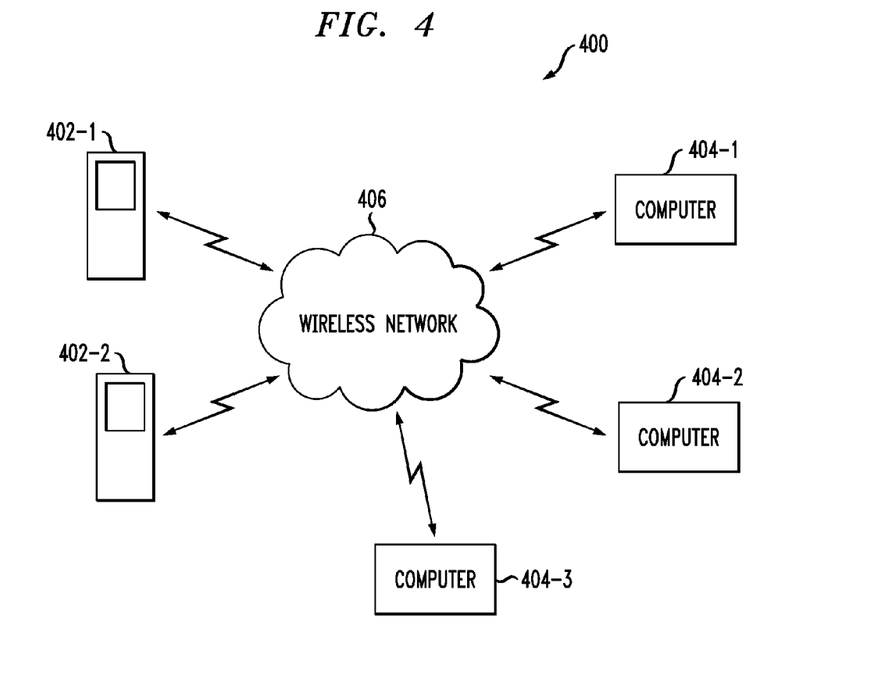
FIG. 4 shows an exemplary embodiment of another communication system that may incorporate shuffled passcode authentication functionality of the type illustrated in FIG. 3.

Authentication techniques of the type described above in conjunction with FIGS. 1-3 may be implemented in a wide variety of different applications. One such application is the wireless communication system 400 illustrated in FIG. 4. The wireless communication system 400 comprises a plurality of mobile telephones 402-1 and 402-2 and computers 404-1, 404-2 and 404-3, configured to communicate with one another over a wireless network 404. Any two or more of the devices 402 and 404 may correspond to respective first and second cryptographic devices configured to implement shuffled tokencode authentication as previously described. It is to be appreciated that the techniques disclosed herein can be implemented in numerous other applications.

It should again be emphasized that the above-described embodiments of the invention are presented for purposes of illustration only. Many variations and other alternative embodiments may be used. For example, the techniques are applicable to a wide variety of other types of cryptographic devices and authentication systems that can benefit from shuffled passcode authentication. Also, the particular configuration of system and device elements shown in FIGS. 1, 2 and 4, and the shuffled passcode authentication process shown in FIG. 3, can be varied in other embodiments. In addition, the particular passcodes and shuffling types used may be varied to meet the needs of various implementations. These and numerous other alternative embodiments within the scope of the appended claims will be readily apparent to those skilled in the art.

What is claimed is:

1. A method comprising the steps of:
    determining a particular type of shuffling to be applied to a passcode in conjunction with submission of that passcode for authentication; and
    verifying that the passcode has been entered in accordance with the particular type of shuffling;
    wherein the particular type of shuffling specifies that at least a portion of the passcode is to be entered in a different order than it would ordinarily be entered; and
    wherein the determining and verifying steps are performed at least in part by a cryptographic device comprising a processor coupled to a memory.

2. The method of claim 1 further including the steps of:
    generating a shuffle indicator signal specifying the particular type of shuffling; and
    transmitting the shuffle indicator signal;
    wherein the verifying step comprises verifying that the passcode has been entered in accordance with the particular type of shuffling specified by the shuffle indicator signal.

3. The method of claim 1 wherein the particular type of shuffling specifies that at least a portion of the passcode is to be entered in a reverse order.

4. The method of claim 1 wherein the step of determining a particular type of shuffling to be applied to the passcode further comprises selecting the particular type of shuffling from a plurality of different available types of shuffling.

5. The method of claim 4 wherein the particular type of shuffling is randomly selected from the plurality of different available types of shuffling.

6. The method of claim 1 wherein the passcode is generated by a first cryptographic device and the determining and verifying steps are performed by a second cryptographic device.

7. The method of claim 6 wherein the first cryptographic device comprises an authentication token and the second cryptographic device comprises at least one authentication server.

8. The method of claim 7 wherein the authentication token comprises one of a hardware authentication token and a software authentication token.

9. The method of claim 6 wherein the second cryptographic device is configured to switch between a shuffled passcode authentication mode and an unshuffled passcode authentication mode.

10. The method of claim 9 wherein the second cryptographic device switches from the unshuffled passcode authentication mode to the shuffled passcode authentication mode responsive to at least one of:
    a determination that a user associated with the first cryptographic device is required to enter a next passcode of a series of time-synchronous passcodes;
    a determination that a challenge is to be presented to said user; and
    a determination that a panic indicator signal has been received.

11. A method comprising the steps of:
    determining a particular type of shuffling to be applied to a passcode in conjunction with submission of that passcode for authentication; and
    generating a shuffle indicator signal specifying the particular type of shuffling; and
    transmitting the shuffle indicator signal;
    verifying that the passcode has been entered in accordance with the particular type of shuffling;
    wherein the step of transmitting the shuffle indicator signal further comprises transmitting the shuffle indicator signal in an out-of-band channel to a client device associated with a user of an authentication token that generates the passcode;
    wherein the verifying step comprises verifying that the passcode has been entered in accordance with the particular type of shuffling specified by the shuffle indicator signal; and
    wherein the determining, generating, transmitting and verifying steps are performed at least in part by a cryptographic device comprising a processor coupled to a memory.

12. The method of claim 11 wherein the step of transmitting the shuffle indicator signal comprises transmitting the shuffle indicator signal as part of a text message sent to the client device.

13. The method of claim 12 wherein the text message is transmitted in accordance with an SMS protocol.

14. A computer program product comprising a processor-readable storage medium having embodied therein one or more software programs, wherein the one or more software programs when executed by the processor cause the steps of the method of claim 1 to be performed.

15. A method comprising the steps of:
    determining a particular type of shuffling to be applied to a passcode in conjunction with submission of that passcode for authentication; and
    entering the passcode in accordance with the particular type of shuffling;
    wherein the particular type of shuffling specifies that at least a portion of the passcode is to be entered in a different order than it would ordinarily be entered; and wherein the determining and entering steps are performed at least in part by a cryptographic device comprising a processor coupled to a memory.

16. The method of claim 15 wherein the step of determining a particular type of shuffling to be applied to the passcode further comprises:
   receiving a shuffle indicator signal; and
   processing the shuffle indicator signal to determine the particular type of shuffling;
   wherein the shuffle indicator signal specifies that at least a portion of the passcode is to be entered in a different order than it would ordinarily be entered.

17. An apparatus comprising:
   a cryptographic device comprising a processor coupled to a memory;
   wherein the cryptographic device is configured to determine a particular type of shuffling to be applied to a passcode in conjunction with submission of that passcode for authentication, and to verify that the passcode has been entered in accordance with the particular type of shuffling; and
   wherein the particular type of shuffling specifies that at least a portion of the passcode is to be entered in a different order than it would ordinarily be entered.

18. The apparatus of claim 17 wherein the cryptographic device comprises at least one authentication server configured to authenticate the passcode generated by another cryptographic device comprising an authentication token.

19. The apparatus of claim 18 wherein the authentication token comprises one of a hardware authentication token and a software authentication token.

* * * * *